United States Patent [19]

Thylén et al.

[11] Patent Number: 4,759,627

[45] Date of Patent: Jul. 26, 1988

[54] FIBRE-OPTIC INTERFEROMETER

[75] Inventors: Lars H. Thylén, Huddinge; Per-Ola Andersson; Sven A. R. Persson, both of Hägersten, all of Sweden

[73] Assignee: Telefonaktiebolaget L M Ericsson, Stockholm, Sweden

[21] Appl. No.: 836,395

[22] Filed: Mar. 5, 1986

[30] Foreign Application Priority Data

Apr. 4, 1985 [SE]  Sweden ............................... 8501713

[51] Int. Cl.$^4$ ............................................... G01B 9/02
[52] U.S. Cl. ..................................... 356/345; 250/227
[58] Field of Search ......................... 356/345; 250/227

[56] References Cited

U.S. PATENT DOCUMENTS 4,376,248  9/1977  Giallorenzi .
4,378,497 10/1977  Giallorenzi .
4,529,876  4/1983  Walker .
4,552,457 11/1985  Giallorenzi et al. ................. 356/345

FOREIGN PATENT DOCUMENTS 2136952  9/1984  United Kingdom .
2147695  5/1985  United Kingdom .

OTHER PUBLICATIONS

Giallorenzi et al., IEEE *J. Quant. Electron.* vol.-QE-18, No. 4, pp. 657-659, Apr. 1982.

*Primary Examiner*—Davis L. Willis
*Assistant Examiner*—Matthew W. Koren
*Attorney, Agent, or Firm*—Roberts, Spiecens & Cohen

[57]  ABSTRACT

The invention relates to a fibre-optic Mach-Zehnder Interferometer for measuring such as change in length. Two light conducting fibres (1,2) are connected to a coherent light source (5). A measurement converter (6), actuated by a measurement quantity (P) changes the length of the optical path and thereby the phase angle for the light wave in one fibre (2). The phase angles for the light waves in the fibres (1, 2) are compared and a corresponding output signal (I) is fed back to compensate for the phase angle change in the measurement converter (6). To make the comparison result (I) independent of the light intensities in the light conducting fibres (1,2) these are connected to an opto-electronic directional coupler (7). This is selected such that the output signal (I) varies as the phase displacement $\phi$, according to the relationship: $I = 2 \times A \times B \times \sin \phi$, where A and B are the amplitudes of the light waves in the fibres (1,2). By using the directional coupler (7), the interferometer can be made simple and accurate. The opto-electronic coupler (7) allows the use of polarized light, whereby accuracy may be further improved.

2 Claims, 3 Drawing Sheets

FIBRE-OPTIC INTERFEROMETER

FIELD OF INVENTION

The invention relates to a fibre-optic interferometer for measuring change in a quantity, e.g. change in length or temperature, and more particularly to an interferometer which includes two light-conducting fibres which are connected to a common coherent light source wherein at least one fibre has a measurement converter, which changes the length of the optical path and thus changes the phase angle for a light wave passing through this fibre in response to change in the quantity, the phase angles of the light waves in the fibres being compared, and the change in phase angle being compensated, the compensation value being utilized as a measurement value.

BACKGROUND

Interferometers of the kind mentioned above, i.e. fibre-optic Mach - Zehnder interferometers, are described in Technisches Messen 51. Jahrgang 1984 Heft 6, R.Kist: "Messwerterfassung mit faseroptischen Sensoren". In these instruments light is sent from a common light source through two optical fibres, and the phase angles for the light waves in the two fibres are compared after having passed through the fibres. If one optical fibre is subjected to a change in length, for example, the phase difference between the light waves changes, and this change is a measure of the change in length. In a known apparatus, the ends of the two fibres are fused together and connected to a detector for the light intensity, in order to compare the phase angles of the light waves in the fibres. The intensity detected here is dependent on the phase displacement. The apparatus is simple but gives poor measurement accuracy in the interferometer since the detected intensity is also dependent on changes in the light source intensity and on the light intensities in the two fibres. In another known apparatus, the light from the two fibres illuminates at a sloping angle of incidence each side of a semitransparent mirror. The intensities of the two light waves departing from the mirror are detected individually and compared. An interferometer with this type of apparatus for enabling the comparison of the phase angles gives relatively good measuring accuracy, which is limited, however, by not being able to use polarized light. The apparatus is also delicate and voluminous, which limits the field of use of the interferometer.

SUMMARY OF INVENTION

The above-mentioned difficulties are solved in accordance with the invention by the light from the optical fibres being taken before detection to a simple optoelectronic coupling device which allows high measuring accuracy.

It is object of the invention to provide an improved fibre optic interferometer.

In achieving the above and other objects of the invention there is provided a fibre optic interferometer for measuring a change in a quantity such as length or temperature. This interferometer, in accordance with the invention comprises a common coherent light source and two light conducting fibres connected to this source. At least one of the fibres includes a measurement converter which changes the length of the optical path. This, accordingly changes the phase angle, for a light wave passing through the fibre, in response to the change in the quantity. In addition there is provided a comparator for comparing the phase angles of the light waves in the fibres by a compensation value. The compensation value constitutes the measurement value. Furthermore provided is an opto-electronic coupler for making the comparison value substantially independent of the light intensity in the light conducting fibres. The fibres are connected to the opto-electronic coupler which includes two inputs and two outputs and light conductors connecting the inputs and outputs via an interaction area. The light conductors are disposed such that the light power is distributed equally between the outputs when a light wave from the light source is applied solely to one of the inputs or when two light waves with a given phase difference which may also be zero are applied to the respective inputs. Other features of the interferometer provided in accordance with the invention will appear in the detailed description which follows hereinbelow. Other objects, features and advantages of the invention will be found also in the following detailed description.

BRIEF DESCRIPTION OF DRAWINGS

A preferred embodiment of the invention will now be described below with reference to a drawing wherein FIG. 1 schematically illustrates a Mach-Zehnder interferometer.

DETAILED DESCRIPTION

Figure 1:
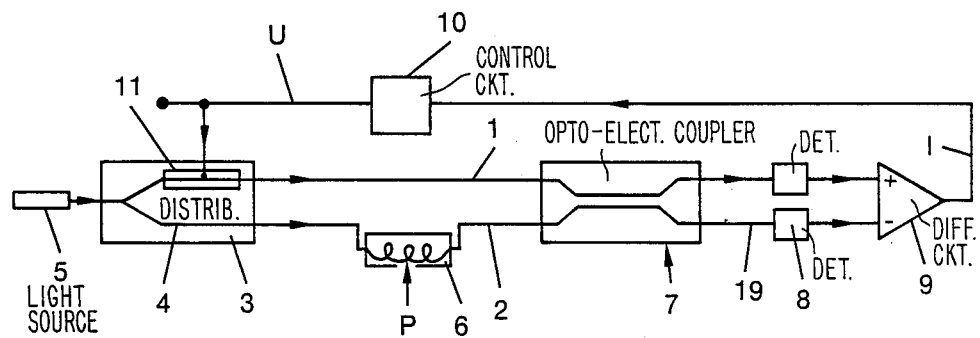

Schematically illustrated in FIG. 1 is an embodiment of a fibre-optic Mach-Zehnder interferometer. In a conventional manner, it has two optical fibres, a reference fibre 1 and a measuring fibre 2, which are connected to a laser 5 via a distribution means 3. The distribution means 3 is a wafer of opto-electronic material having wave conductors 4 diffused into its surface, these conductors distributing the light from the laser to both fibres 1 and 2. A measurement converter 6 is connected to the measuring fibre 2 for being acted on by a quantity P, e.g. a change in length or temperature, which it is desired to measure. The laser transmits light waves within a narrow wavelength range, which pass through the component 3 and the fibres 1 and 2. At the remote ends of the fibres the light waves will be phase-displaced in relation to each other in response to the difference in length of optical path from the distribution point on the distribution means 3 to the remote ends of the fibres. The length of the optical path depends on the distance the light wave travels and the refractive index of the medium it passes through. The length of the optical path may be changed in the measurement converter 6, e.g. by the fibre 2 being stretched so that the distance is increased, or by the fibre being subjected to a transverse compression force or bending so that its refractive index changes. When the measurement converter 6 is subjected to the action of the quantity P, the length of the optical path is changed in response to this action so that a phase displacement of an angle $\phi$ between the light waves is obtained. The phase angles for the light waves in the measuring fibre 2 and in the reference fibre 1 are compared with the aid of two opto-electronic detectors 8 for the light intensity and a difference circuit 9, the inputs of which are connected to the outputs of the detector 8. In order then to obtain in a simple manner an accurate comparison signal I from the difference circuit 9, the light, in accordance with the invention, is led before detection through an opto-electronic coupling means 7, which will be described below. The comparison signal I is conventionally fed back to compensate for the phase displacement $\phi$ between the light waves in the two optical fibres 1 and 2. The output of the difference circuit 9 is connected to a control circuit 10, having its output control signal U connected to an electrode 11 on the distribution means 3. With the aid of the control signal U, the speed of the light is changed and thus the refractive index of the wave conductor 4 at the electrode 11. The length of the optical path is thus changed and thereby the phase angle for a light-wave in the reference fibre 1. The phase difference occurring in the measurement converter 6 can be compensated in this way via the control signal U, which is the compensation being a measure of the quantity P.

Figure 2:
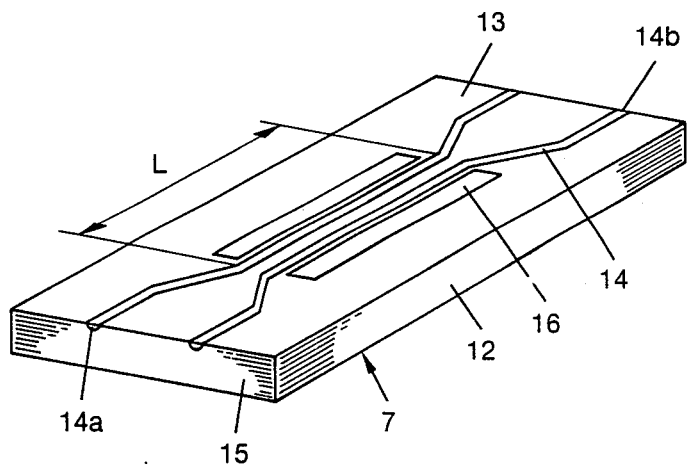
FIG. 2 is a perspective view seen from above of an opto-electronic directional coupler.

As mentioned above, the light is led from the reference fibre 1 and the measuring fibre 2, in accordance with the invention, through the opto-electronic coupling means 7 before detecting the light intensity. The coupling means in the embodiment is an opto-electronic directional coupler, and is illustrated in FIG. 2. A more specific description of the directional coupler's function is to be found in IEEE Journal of Quantum Electronics, Vol. QE-12, No. 7, July 1976, H. Kogelink and R. Schmidt: "Switched Directional Couplers with Alternating $\Delta\beta$", or in IEEE Transactions on Circuits and Systems, Vol. Cas-26, No. 12, December 1979, R. Schmidt and R. Alferness: "Directional Coupler Switchers, Modulators, and Filters Using Alternating $\Delta\beta$ Techniques". The directional coupler comprises a wafer 12 of opto-electronic material, e.g. lithium niobate, with light wave conductors 14 at its upper surface 13. These conductors have a higher refractive index than the material in the wafer and can be obtained by a process such as diffusing titanium into surface layer of the wafer. At the planar end surfaces 15 of the wafer 12 the light wave conductors 14 have inputs 14$a$ and outputs 14$b$, and are disposed close to each other in an interacton area L. A light ray led into one of the conductors 14 migrates completely or partially over to the other conductor in the interaction area L, as described in the publications mentioned. The distribution of the light energy at the outputs 14$b$ depends on the wave length of the light, the extent of the interaction area and the coupling between the wave conductors. This distribution can be affected by an electric potential being applied between electrodes 16 at the surface of the wafer along the wave conductors 14 in the interaction area L. To obtain the desired comparison signal I from the difference circuit 9, the parameters of the directional coupler are selected such that the light energy for a light wave on one of the light wave conductor inputs 14$za$ is distributed equally between the outputs 14$b$, as will be more closely described in connection with FIG. 3. In this figure, the directional coupler 7 is illustrated with the reference fibre 1 and the measuring fibre 2 each connected to one of the inputs 14$a$. Each output 14$b$ is connected via an optical fibre 19 to each of the opto-electronic detectors 8. The light wave from the laser in the reference fibre 1 has an amplitude A and the light wave in the measuring fibre 2 has an amplitude B, so that the intensities in both light waves are proportional to $A^2$ and $B^2$. Before the measurement of the quantity P, the light waves in the measuring and reference fibres may be mutually phase displaced at an angle which is a multiple of half a revolution. On actuation of the measurement converter 6 by the quantity P, the length of the optical path changes so that the phase difference between the light waves at the inputs 14$a$ is changed by an angle $\phi$. The light waves interact mutually in the interaction area L and the intensities $U_1$ and $U_2$ of the outgoing light waves detected by the detectors 8. These send electrical signals $I_1$ and $I_2$ respectively proportional to $U_1$ and $U_2$, essentially in accordance with the relationships:

$$I_1 = \tfrac{1}{2}(A^2 + B^2) + A B \sin \phi$$

$$I_2 = \tfrac{1}{2}(A^2 + B^2) - A B \sin \phi.$$

The difference circuit 9 forms the difference between the signals $I_1$ and $I_2$ and sends the output signal I according to the relationship:

$$I = I_1 - I_2 = 2 A B \sin \phi.$$

As mentioned in conjunction with FIG. 1, the signal I is fed back through the control circuit 10, which sends the control signal U to the electrode 11. The phase displacement between the light waves in the fibres 1 and 2 is thus compensated so that the angle $\phi$ decreases. For full compensation, $\phi = 0$ and according to the relationship above, $I = 0$. The control signal U has then reached its final value and is a measure of the quantity P, which it is desired to measure. It should be noted that the phase compensation also functions if the phase displacement in the measurement converter 6 is greater than 90°. When the quantity P is applied, and the phase displacement in the measurement converter increases, there is continuous compensation of the phase difference or the angle $\phi$ between the measuring fibre 2 and the reference fibre 1 as the control signal U increases to a corresponding extent.

It has been mentioned above that the parameters for the directional coupler 7 should be selected so that if light is connected solely to one of the inputs 14$a$ the light energy is distributed equally between the outputs 14$b$. This will be apparent from the relationship for the signals $I_1$ and $I_2$. For the amplitude $B = 0$ there is obtained half the light energy on each of the outputs 14$b$.

From the relationship for the signal I stated above, it will be seen that this signal is practically independent of the light amplitudes A and B for full compensation of the phase displacement when $\phi = 0$. The control signal U, which is the measurement value of the quantity P, is thus independent of a variation in the light strength from the laser 5 and independent of the distribution of light energy between the measuring fibre 2 and the reference fibre 1. This allows the interferometer to have a relatively simple implementation and high accuracy at the same time.

Figure 3:
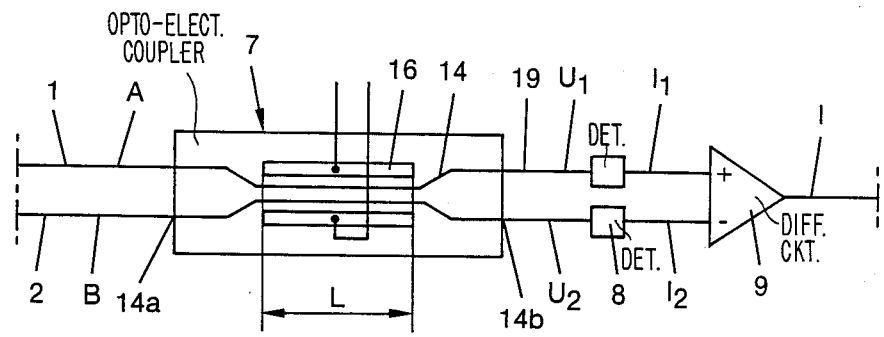
FIG. 3 illustrates a part of the interferometer with directional coupler and light detectors.
Figure 4:
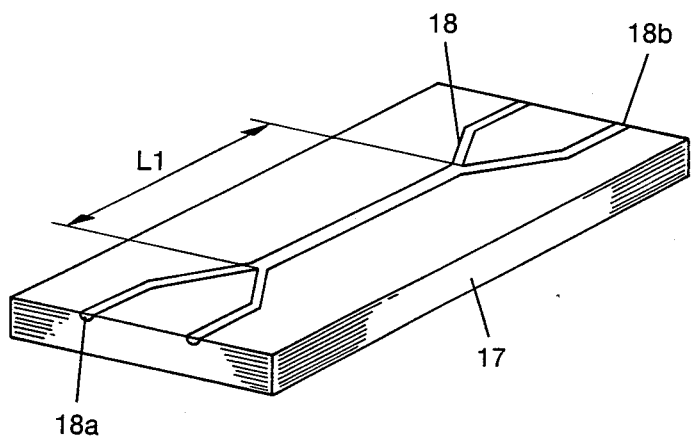
FIG. 4 is a perspective view seen from above of a coupling device with an opto-electronic bifurcation.

In the embodiment described above, the coupling means 7 of the interferometer is an opto-electronic directional coupler. The coupling means 7 may also be an opto-electronic bifurcation, as illustrated in FIGS. 3 and 4. Similar to the directional coupler, the opto-electronic bifurcation has wave guides 18 diffused into the surface of a wafer 17 made from opto-electric material. The bifurcation has two inputs 18a and two outputs 18b, but in contradistinction to the directional coupler it only has one wave guide in its interaction area L1. The incoming light waves from the measuring and reference fibres are superposed in the interaction area and the intensities of the outgoing light waves closely follow the relationships applicable to the directional coupler that have been given above. A closer description of the opto-electronic difurcation will be found in "Applied Physics Letter, Vol 31, No 4, Aug. 15, 1977, M. Papuchon, M. Roy and O. B. Ostorwsky: "Electrically active optical bifurcation: BOA".

At the directional coupler 7 in the described interferometer, the comparison signal I assumes a zero value when the phase displacement $\phi$ between the light waves is compensated to zero value according to the relationship I=2 A B sin $\phi$. A directional coupler can also be implemented such that the outgoing difference signal I assumes a zero value when the incoming light waves are phase displaced by a given angle $\phi_o$ in relation to each other. When two light waves with the amplitudes A and B and the phase displacement $\phi$ are applied to the inputs of this directional coupler the light energy is distributed equally between the outputs. The angle $\phi_o$ is characteristic for the directional coupler, and the comparison signal I obtained for the phase displacement $\phi$ is essentially defined by the relationship:

$$I = I_1 - I_2 = 2 A B \sin(\phi - \phi_o).$$

The length of the optical paths in the measuring and reference fibres are selected so that the light waves are phase displaced by the angle $\phi = \phi_0$, as near as a multiple of half a revolution, when the measurement converter 6 is unaffected by the quantity P. The changes in phase displacement which are obtained in the measurement converter 6 during measurement are compensated about the angle $\phi_0$ by the control signal U, as described above.

Figure 5:
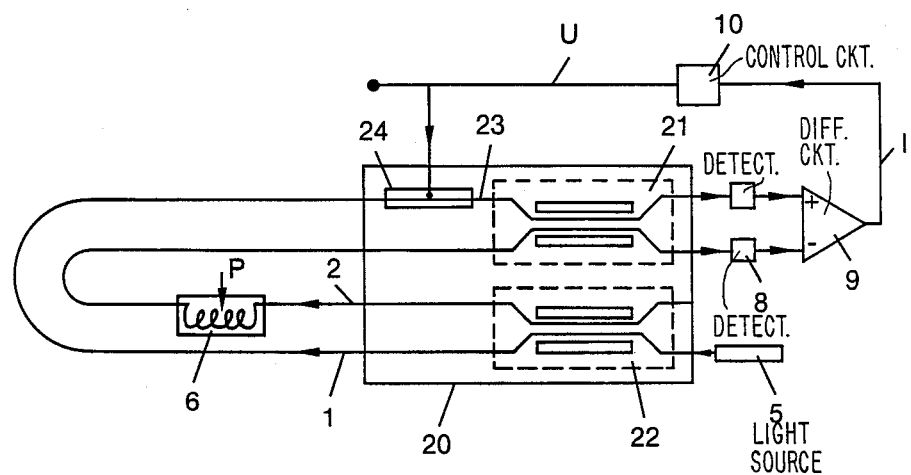
FIG. 5 illustrates a further interferometer in accordance with the invention.

A further embodiment of an interferometer in accordance with the invention is illustrated in FIG. 5. A wafer 20 of opto-electronic material has an opto-electronic directional coupler 21 on its upper planar surface, as described in connection with FIG. 2. The wafer has a further directional coupler 22 and a wave conductor 23 with an electrode 24. The wave conductor 23 is connected to one input of the directional coupler 21. The measuring fibre 2 with the measurement converter 6 is optically connected to the other input of the directional coupler 21 and to one output of the further directional coupler 22. The reference fiber 1 is optically connected to the other output of the further directional coupler 22 and to the wave conductor 23. Light from the laser 5 is distributed in the directional coupler 22 to the measuring fibre 2 and reference fibre 1. After passage through the fibres 1 and 2, the light waves have been mutually phase displaced an angle $\phi$ by the action of the quantity P on the measurement converter 6. This phase displacement is compensated by the control signal U actuating the electrode 24, as described in connection with FIG. 1. The light waves from the measuring and reference fibres are taken through the directional coupler 21 before detection in the detectors 8 and are compared in the difference circuit 9, as described in connection with FIG. 1. The difference signal I actuates the control circuit 10, which sends the control signal U to the electrode 24. In this interferometer all the opto-electronic components are on the common wafer 20, resulting in the advantage that the interferometer can be made simple and robust.

The sensitivity of an interferometer of the kind described above depends on how accurately the change of the angle $\phi$ can be detected. This accuracy is greatest for light waves of plane polarized light having a well-defined phase angle. The inventive interferometer has the advantage of being able to utilize this condition as the polarization plane for a light wave is not changed in the opto-electronic coupling means 7. If polarization-maintaining optical fibres and a polarization-maintaining distribution means are used, the polarization direction is retained for light from the laser 5 through the entire interferometer up to the detectors 8. The sensitivity which can thus be obtained is very great and is $10^{-12}$ m, expressed as the deviation in length of the measuring fibre.

What is claimed is:

1. A fibre-optic interferometer for measuring a change in quantity and comprising a common coherent light source, two-light-conducting fibres, a first directional coupler connecting said light source to said fibres, a measurement converter connected to one of said fibres for changing the length of the optical path, and thus the phase angle, for a light wave passing through said one fibre in response to said change in the quantity, comparing means for comparing the phase angles of the light waves in the fibres to yield a comparison value, compensating means for compensating said change in phase angle by a compensation value, the compensation value constituting a measurement value, and opto-electronic coupling means for making the comparison value substantially independent of light intensity in the light-conducting fibres, said opto-electronic coupling means including a second directional coupler which has two inputs and two outputs and light conductors connecting the inputs and outputs via an interaction area which is disposed such that the light power is distributed equally between the outputs and, when a light wave from the light source is applied to either or both inputs has a phase different ($\phi$) deviating from a given phase difference ($\phi_o$), the outgoing intensities are affected by a factor depending on the phase difference ($\phi$) essentially according to relationships:

$$U_1 = (A^2 + B^2)/2 + A B \sin(\phi - \phi_o)$$

$$U_2 = (A^2 + B^2)/2 - A B \sin(\phi - \phi_o)$$

where A and B are the amplitudes of the light waves at the inputs, $\phi$ is their mutual phase difference, $\phi$ is said given phase difference and $U_1$ and $U_2$ are the intensities of the light waves at the outputs so that the difference value between these intensities will be essentially independent of variation in light intensities in the fibres on compensation of the phase difference ($\phi$) to the given value ($\phi_o$), said first directional coupler having inputs and outputs for said two light conducting fibres and light conductors connecting said inputs and outputs via an interaction area to adjust the light power at said outputs, said one light conducting fibre connected to one of said outputs of said first directional coupler being connected, to said measurement converter which in turn is connected to one of said inputs of said second directional coupler, said interferometer further comprising a wafer of optoelectronic material, said first and second directional couplers being on said wafer, a control circuit connected to said comparing means for producing said measurement value, and an electrode on said wafer connected to said control circuit for adjusting said first and second directional couplers.

2. A fibre-optic interferometer according to claim 1 wherein said compensating means further comprises detectors respectively connected to the outputs of said second directional coupler, said comparing means comprising a difference circuit connected to said detectors and to said control circuit.

* * * * *